United States Patent Office 2,793,187
Patented May 21, 1957

2,793,187

CONDUCTIVE OIL-BASE DRILLING FLUIDS

Paul W. Fischer, Whittier, Calif., assignor to Union Oil Company of California, Los Angeles, Calif., a corporation of California No Drawing. Application December 21, 1953, Serial No. 399,636

16 Claims. (Cl. 252—8.5)

This invention relates to oil-base drilling fluids, and in particular concerns certain types of calcium-contaminated oil-base drilling fluids which have been rendered electrically conductive by the inclusion therein of certain additives.

In drilling oil or gas wells by means of rotary drilling tools, the use of so-called "oil-base" drilling fluids has become increasingly widespread. Such type of drilling fluid is characterized by the fact that it contains a minimum amount of water, i. e., less than about 10 percent and usually less than about 5 percent, and is thus distinguished over the so-called "emulsion-base" fluids, which characteristically contain greater than 10 percent water. One of the more successful oil-base fluids is the type described in U. S. Patents Nos. 2,542,019 and 2,542,020, and prepared by dispersing minor proportions of an alkali-metal soap, an alkaline-earth metal base, a hydratable clay and water in a mineral oil. During preparation of such fluid, the alkaline-earth metal base, which is usually calcium oxide or hydroxide, in part reacts by metathesis with the alkali-metal soap, which is preferably a sodium or potassium soap of modified rosin acids, to form the corresponding alkaline-earth metal soap. The finished composition thus comprises a mineral oil dispersion of water and clay or other suspended solids stabilized by a mixture of a water-dispersible alkali-metal soap and an oil-dispersible alkaline-earth metal soap. This type of fluid has excellent fluid loss, viscosity, and gel strength characteristics and may be weighted to high apparent densities. Unfortunately, however, it is not adapted to use in well-logging operations which require that the drilling fluid employed possess relatively good electrical conductivity. A typical fluid of this type has an electrical resistivity of the order of $1 \times 10^8$ ohm-cms., whereas most electric logging operations require that the drilling fluid have a resistivity not greater than about $50 \times 10^3$ ohm-cms. and preferably of the order of about $5 \times 10^3$ ohm-cms.

In copending application Serial No. 284,451, filed June 16, 1952, now U. S. Patent No. 2,696,468, there is disclosed and claimed a method whereby various types of oil-base drilling fluids can be rendered eletrically conductive. Said method consists in adding to the fluid sufficient water to adjust the water content of the fluid to between about 3 and about 10 percent, between about 0.01 and about 5 percent of a water-soluble metal salt or hydroxide, and between about 0.1 and about 8 percent of an emulsifying agent selected from the class consisting of sulfated oils, sulfated alcohols, organic sulfonates, and alkali-metal salts thereof. If desired, a portion of said emulsifying agent, e. g., 25–75 percent by weight, may be replaced by an alkali-metal soap of humic acid. By use of such method the electrical resistivity of an oil-base fluid of the type described in U. S. Patent No. 2,542,019 may be reduced to less than $50 \times 10^3$ ohm-cms., thereby rendering such fluid entirely suitable for use in electric logging operations.

A convenient way of applying the aforesaid method for making conductive oil-base drilling fluids is to prepare a "conductivity additive" composition comprising the water, the metal salt or hydroxide and the emulsifying agent in suitable proportions, and to add a suitable amount of such additive to a previously formulated oil-base drilling fluid whenever it is desired to render the latter conductive. However, while such method is highly satisfactory in instances where the previously formulated fluid has been correctly prepared and/or has not previously been used for drilling, it is not always satisfactory when the drilling fluid has been improperly prepared and/or has been previously used. More particularly, it has been found that if the drilling fluid which is to be rendered conductive through the use of a conductivity additive as described above is one which contains an excess of calcium, either as a result of contamination with calcium brines and/or cement cuttings or as a result of an excess of calcium oxide or hydroxide having been employed in its preparation, then it cannot be made satisfactorily conductive by the use of the conductivity additive. Also, the fluid loss properties of such calcium-contaminated fluids are often unsatisfactory.

It is accordingly an object of the present invention to provide means whereby calcium-contaminated oil-base drilling fluids of the above-described type may be conditioned so that they can be made electrically conductive through the use of conductivity additives.

I have found that this object can be realized by treating the calcium-contaminated drilling fluid with a mixture of an alkali-metal bicarbonate, e. g., sodium bicarbonate, and calcium oxide or hydroxide prior to adding the conductivity additive. More particularly, I have found that oil-base drilling fluids of the type consisting of a mineral oil dispersion of water and clay stabilized with a mixture of water-dispersible and oil-dispersible metal soaps, which for one reason or another contain an excess of calcium ion, can be conditioned to render them satisfactory for being made electrically conductive by adding thereto an alkali-metal bicarbonate and calcium oxide or hydroxide in amounts and proportions hereinafter more fully defined. The manner in which such treatment effects the desired result is not known, but repeated tests on both laboratory and full field scales show it to be highly efficacious. This is particularly surprising in view of the fact that the treatment which overcomes the adverse effects of calcium contamination comprises the addition of even further amounts of calcium to the fluid.

The oil-base drilling fluids to which the conditioning treatment of the invention is applicable are calcium-contaminated fluids of the type prepared by dispersing minor amounts of water, hydratable clay, an alkali-metal soap and an alkaline calcium compound, e. g., calcium oxide or hydroxide, in mineral oil. Conventionally, such fluids contain between about 0.2 and about 10 percent by weight of water, between about 0.1 and about 5 percent by weight of hydratable clay, between about 0.2 and about 10 percent by weight of the alkali-metal soap, and between about 0.1 and about 5 percent by weight of calcium oxide. Usually, the latter component is employed in an amount only slightly in excess of the quantity chemically equivalent to the alkali-metal soap, but in some instances, either through mis-calculation or by reason of variations in the alkali-metal soap or by contamination from external sources, the fluid will contain a substantial amount of free calcium oxide or other calcium compounds. The conditioning treatment of the present invention overcomes the adverse effect which such excess calcium oxide or other calcium compounds have on the drilling fluid properties.

While a wide variety of alkali-metal soaps may be employed in formulating this type of drilling fluid, those most widely used are alkali-metal alkali saponification products of heat-treated rosin. Such saponification products are available commercially, and in general are obtained by reacting a heat-treated rosin with an aqueous alkali-metal alkali, e. g., sodium or potassium hydroxide or carbonate, at an elevated temperature until the resin acids are saponified and the product contains the desired amount of water. The amount of alkali employed is usually somewhat less than theoretical, with the result that the saponification product contains a small proportion, usually 1–15 percent by weight, of free resin acids. The heat-treated rosin employed in forming such saponification products may be produced in various ways. For example, wood or gum rosin may simply be heated under non-oxidizing conditions at a temperature between about 250° C. and about 350° C. until a substantial degree of decarboxylation is effected as indicated by an increase in the specific rotation of the rosin to a value above about +5°.

A saponification product which is preferred in preparing drilling fluids of the present type is prepared by saponifying such a heat-treated rosin with aqueous potassium hydroxide, and comprises between about 45 and about 55 percent by weight of potassium resin acid soaps, between about 30 and about 35 percent by weight of non-saponifiable materials, between about 5 and about 10 percent by weight of free resin acids, and between about 5 and about 10 percent by weight of water. Another preferred saponification product may be prepared from a disproportionated rosin such as is obtained by heating wood or gum rosin at a temperature between about 150° C. and about 300° C. for 0.25–5 hours in the presence of a hydrogenation catalyst but in the absence of added hydrogen. The sodium hydroxide saponification product of such a disproportionated rosin is available commercially under the trade name "Dresinate-731."

The conductivity additive compositions which are employed to impart the property of electrical conductivity to the above type of oil-base drilling fluid in general comprise between about 10 and about 60 parts by weight of an electrolyte selected from the class consisting of water-soluble metal salts and water-soluble metal hydroxides and between about 20 and about 80 parts by weight of an emulsifying agent selected from the class consisting of sulfated oils, sulfated alcohols, aliphatic and naphthenic sulfonates, aromatic sulfonates, and the alkali-metal salts thereof, dispersed in about 100 parts by weight of water. Preferably, the electrolyte comprises a mixture of an alkali-metal hydroxide and a water-soluble salt of a strong base and a weak acid, e. g., a mixture of sodium or potassium hydroxide and potassium carbonate, sodium silicate, sodium pyrophosphate, etc. Also, the emulsifying agent may comprise a mixture of one of the sulfonates or sulfated compounds of the foregoing class and an alkali-metal soap of humic acid. An additive composition of this type which has been found particularly effective is formulated as follows:

| | Percent by weight |
|---|---|
| Water | 50.0 |
| Sodium hydroxide | 3.7 |
| Sodium silicate (N grade) | 15.6 |
| Trisodium polyphosphate | 8.6 |
| Sulfonated castor oil | 8.3 |
| Sodium humate | 13.8 |
| | 100.0 |

In determining the electrical resistivity of oil-base drilling fluids, the following procedure is followed: An electrode assembly comprising two 1-inch square nickel plates spaced about one inch apart is immersed in a sample of the fluid being tested, and the voltage which must be applied across the electrodes to obtain a predetermined current flow through the fluid (usually 400 milliamperes) is ascertained. By calibrating the electrode assembly against a liquid of known resistivity, the resistivity of the fluid sample being tested may be determined from such voltage reading. It has been found, however, that many drilling fluids undergo a dielectric breakdown during such testing procedure. Thus, when the fluid is first subjected to the test the voltage across the electrodes may be increased to a relatively high value, e. g., 130 volts, before substantial current flows. As soon as the current starts to flow, however, the voltage may be substantially reduced without the flow of current dropping below the aforesaid predetermined value. Accordingly, in making the resistivity determination, the electrode assembly is immersed in the fluid and the voltage applied to the electrode plates is gradually raised until the predetermined flow of current is obtained. A so-called "initial resistivity" value is determined from the applied voltage. The voltage is then gradually reduced, and the minimum voltage required to maintain the predetermined current flow is ascertained, and a so-called "ultimate resistivity" value is determined from such minimum voltage reading. The dielectric breakdown of the fluid is more or less permanent and the ultimate resistivity value represents the resistivity which the fluid will have during electric logging operations.

Fluid loss and viscosity characteristics are determined as described in API Code No. 29, dated July 1942.

The following procedure and data illustrate the use of a conductivity additive of the type described above to render the present type of oil-base drilling fluid electrically conductive, and the effect thereon of excess calcium ion in the fluid: The following drilling fluid concentrate is prepared:

| | Grams |
|---|---|
| Gas oil | 2800 |
| Decarboxylated rosin soap | 1400 |
| Disproportionated rosin soap | 1400 |
| Bentonite | 560 |
| Water | 840 |

The decarboxylated rosin soap is the above-described potassium hydroxide saponification product of heat-treated rosin, and the disproportionated rosin soap is the sodium hydroxide saponification product of disproportionated wood rosin sold under the trade name "Dresinate 731." The concentrate is then dispersed in a mixture of 3 gals. of gas oil and 17 gals. of light domestic fuel oil (API gravity=13–15°; viscosity=30–40 secs. SUS at 122° F.) and 840 gms. of calcium oxide is added, after which the mixture is thoroughly stirred for several hours. The resulting oil base drilling fluid has a Marsh viscosity of about 150 secs., a fluid loss value of 0.0 ml./hr. at 100° F., and an initial gel strength of about 3.0 lbs./100 sq. ft.

The following conductivity additive composition is prepared:

| | Grams |
|---|---|
| Water | 1160 |
| Sodium hydroxide | 40 |
| Sodium silicate (N grade) | 250 |
| Trisodium pyrophosphate | 100 |
| Sulfonated castor oil | 50 |
| Sodium humate | 40 |

These drilling fluid and conductivity additive compositions are employed to prepare the following compositions having electrical resistances as tabulated:

| Comp. No. | Drilling Fluid, ml. | Conductivity Additive, ml. | CaO, gms. | Resistivity, Ohm-cms.×10³ | | 
|---|---|---|---|---|---|
| | | | | Initial | Ultimate |
| 1 | 1,500 | None | None | >1,000 | >1,000 |
| 2 | 1,500 | 225 | None | 5 | 5 |
| 3 | 1,500 | None | 15 | >1,000 | >1,000 |
| 4 | 1,500 | 225 | 15 | >1,000 | >1,000 |

It will be seen from these data that while the conductivity additive is very effective in imparting electrical conductivity to a fresh properly prepared fluid, it is ineffective where the fluid has become contaminated with lime.

The effect of treating lime-contaminated drilling fluids with an alkali-metal bicarbonate alone is shown by the data tabulated below. The compositions tested were prepared by adding the indicated quantities of sodium bicarbonate to lime-contaminated samples consisting of 1500 ml. of the base drilling fluid described above and 15 gm. of calcium oxide, and thereafter adding 225 ml. of the conductivity additive described above.

| Comp. No. | NaHCO₃, gms. | Resistivity, Ohm-cms.×10³ | | Fluid Loss |
|---|---|---|---|---|
| | | Initial | Ultimate | |
| 5 | None | >1,000 | >1,000 | 90 ml./hr. |
| 6 | 5 | 62 | 40 | 100 ml./30 min. |
| 7 | 10 | 33 | 20 | 100 ml./13 min. |
| 8 | 15 | 5 | 1 | 100 ml./7.5 min. |

It will be seen that the untreated lime-contaminated drilling fluid was not only incapable of being made electrically conductive, but had extremely poor fluid loss properties. The addition of sodium bicarbonate greatly improved the electrical conductivity, but had an even further adverse effect on the fluid loss.

The effect of treating the calcium-contaminated fluid with calcium oxide in addition to sodium bicarbonate is illustrated by the data tabulated below. Each composition tested was prepared by adding the indicated amounts of sodium bicarbonate and calcium oxide to lime-contaminated samples prepared by adding 15 gm. of lime to 1500 ml. of the base drilling fluid described above, and thereafter adding 225 ml. of the conductivity additive.

| Comp. No. | NaHCO₃, gms. | Calcium Oxide, gms. | Resistivity, Ohm-cms.×10³ | | Fluid Loss |
|---|---|---|---|---|---|
| | | | Initial | Ultimate | |
| 9 | 5 | 15 | >1,000 | >1,000 | 100 ml./14 min. |
| 10 | 10 | 15 | >1,000 | >1,000 | 100 ml./16 min. |
| 11 | 15 | 15 | >1,000 | >1,000 | 100 ml./24 min. |
| 12 | 25 | 15 | 34 | 23 | 100 ml./43 min. |
| 13 | 10 | 30 | >1,000 | >1,000 | 100 ml./36 min. |
| 14 | 20 | 30 | >1,000 | >1,000 | 10 ml./hr. |
| 15 | 30 | 30 | 5 | 3 | 0 ml./hr. |
| 16 | 40 | 30 | 1 | 1 | 0 ml./hr. |

It will be seen that treatment of the contaminated fluid with sufficient amounts of both sodium bicarbonate and lime renders the fluid capable of being made electrically conductive and restores its initial excellent fluid loss properties.

The amounts in which the alkali-metal bicarbonate and calcium oxide or hydroxide are employed in treating a calcium-contaminated drilling fluid in accordance with the invention depend upon the extent of the calcium contamination. In general, the alkali-metal bicarbonate will be employed in an amount representing between about 50 and about 300 percent of the weight of the free calcium ion in the contaminated fluid calculated as calcium oxide, and between about 0.75 and about 2.0 parts of added calcium oxide or calcium hydroxide is employed per part of alkali-metal bicarbonate. A particularly convenient mode of practicing the invention consists in initially preparing a treating composition consisting of between about 30 and about 60 percent by weight of the alkali-metal bicarbonate and between about 70 and about 40 percent by weight of calcium oxide or hydroxide. The calcium ion content of the contaminated drilling fluid is determined by conventional analytical methods, e. g. by titration with a standard Versene (sodium ethylenediamine tetra-acetate) solution, and the amount of calcium ion so found is calculated as calcium oxide. The contaminated drilling fluid is then treated by adding thereto sufficient of the treating mixture to provide between about ½ and about 3 parts by weight of the alkali-metal bicarbonate per calculated part of calcium oxide in the contaminated fluid.

The following examples will illustrate several ways in which the invention has been applied, but are not to be construed as limiting the same.

*Example I*

Contaminated drilling fluids were prepared by adding varying amounts of lime and 75 ml. of various types of aqueous contaminants to 1500 ml. of the base drilling fluid hereinbefore described. The compositions were treated by stirring in varying amounts of sodium bicarbonate and calcium oxide, and 150 ml. of a conductivity additive was then added to the treated compositions. The conductivity additive was formulated as follows:

Water _____ ml__ 620
Sodium hydroxide _____ gms__ 40
Sodium silicate (N Grade) _____ gms__ 250
Trisodium pyrophosphate _____ gms__ 100
Sulfonated castor oil _____ gms__ 50
Sodium humate _____ gms__ 40

The compositions, viscosities, resistivities and fluid loss values of the drilling fluids so prepared were as follows:

| Comp. No. | Aqueous Contaminant | Lime-Contamination, gms. | Added NaHCO, gms. | Added CaO, gms. | Viscosity, Marsh Secs. | Resistivity, Ohm-cms.×10³ | | Fluid Loss |
|---|---|---|---|---|---|---|---|---|
| | | | | | | Initial | Ultimate | |
| 17 | Brine [1] | 5 | 4 | None | 159 | 6 | 6 | 100 ml./10 min. |
| 18 | do | 20 | 15 | None | 210 | 5 | 2 | 52 ml./hr. |
| 19 | do | 15 | 10 | 30 | 161 | >1,000 | >1,000 | 100 ml./36 min. |
| 20 | do | 15 | 20 | 30 | 187 | >1,000 | >1,000 | 10 ml./hr. |
| 21 | do | 15 | 30 | 30 | 177 | 5 | 3 | 0 ml./hr. |
| 22 | do | 15 | 40 | 30 | 162 | 1 | 1 | 0 ml./hr. |
| 23 | NaCl [2] | 25 | 24 | 30 | 193 | 2 | 2 | 0 ml./hr. |
| 24 | NaCl [2] | 30 | 24 | 30 | 210 | 3 | 2 | 0 ml./hr. |
| 25 | Water | 15 | 25 | 30 | 168 | 10 | 8 | 0 ml./hr. |

[1] Brine from Coalinga (Calif.) oil field.
[2] 3% aqueous solution.

Example II

An oil-base drilling fluid which had been prepared from the above-described potassium hydroxide saponification product of decarboxylated rosin was employed to drill a well in the Newhall district of California. When it became desirable to obtain an electric log of the bore, a sample of the fluid was taken and treated with the following conductivity additive composition:

| | Percent by weight |
|---|---|
| Water | 55 |
| Sodium hydroxide | 4 |
| Sodium silicate (N grade) | 17 |
| Sulfonated castor oil | 9 |
| Sodium humate | 15 |

The resistivity of the sample was about 80 ohm-cms.$\times 10^3$. A 100-bbl. sample of the fluid was then withdrawn from the bore and admixed with 200 bbls. of sodium bicarbonate and 250 bbls. of calcium oxide by circulating it through the hopper with the mud pump for 20 minutes. About 6 bbls. of the conductivity additive was then added, and the mixture was added to the remainder of the drilling fluid in the bore hole. After circulation of the entire quantity of fluid for 20 minutes, a sample of the fluid taken from the bore was found to have a resistivity of about 8 ohm-cms.$\times 10^3$.

While the foregoing specific examples and illustrative data are limited to application of the principle of the invention to calcium-contaminated drilling fluids of a specific type, it is to be understood that it is equally applicable to any oil-base drilling fluid of the type prepared by dispersing minor amounts of water, a hydratable clay, a water-dispersible alkali-metal soap and an alkaline calcium compound, e. g., calcium oxide or hydroxide, in mineral oil. Thus, it is applicable to the treatment of drilling fluids of this type in which the alkali-metal soap is a fatty acid soap, e. g. sodium oleate, potassium stearate, etc., a naphthenic acid soap or even a sulfonic acid soap. Also, the operability of the invention is not limited with respect to the particular conductivity additives employed in the examples, but extends broadly to the use of a sulfated oil, sulfated alcohol, organic sulfonates or alkali-metal salts thereof in combination with water-soluble metal hydroxides and salts in rendering oil-base drilling fluids of the above type electrically conductive.

Other modes of applying the principle of my invention may be employed instead of those explained, change being made as regards the methods or materials employed provided the composition stated by any of the following claims, or the equivalent of such stated composition, be obtained.

I, therefore, particularly point out and distinctly claim as my invention:

1. An electrically conductive oil-base drilling fluid comprising (1) a normally non-conductive drilling fluid initially prepared by dispersing minor amounts of water, an hydratable clay, a water-dispersible alkali-metal soap and an alkaline calcium compound in mineral oil, said drilling fluid containing calcium in substantial excess of the amount chemically equivalent to said alkali-metal soap; (2) between about 0.5 and about 3 parts by weight of an alkali-metal bicarbonate per part by weight of said excess of calcium calculated as calcium oxide; (3) between about 0.75 and about 2 parts by weight of a calcium compound selected from the class consisting of calcium oxide and calcium hydroxide per part by weight of said alkali-metal bicarbonate; (4) between about 3 and about 10 percent, based on the weight of the entire composition, of water; and (5) sufficient of an electrolyte selected from the class consisting of water-soluble metal hydroxides and water-soluble metal salts and an emulsifying agent selected from the class consisting of sulfated oils, sulfated alcohols, organic sulfonates, and alkali-metal salts thereof, to render the composition electrically conductive.

2. A composition as defined by claim 1 wherein said alkali-metal bicarbonate is sodium bicarbonate.

3. A composition as defined by claim 2 wherein said added calcium compound is calcium oxide.

4. A composition as defined by claim 3 wherein the alkali-metal soap component of the drilling fluid is an alkali-metal alkali saponification product of rosin which has been heat-treated under conditions of time and temperature sufficient to increase its specific rotation to a value above about $+5°$.

5. A composition as defined by claim 3 wherein the alkali-metal soap component of the drilling fluid is a saponification product of heat-treated rosin comprising 45–55 percent by weight of potassium resin acid soaps, 30–35 percent by weight of unsaponifiables, 5–10 percent by weight of free resin acids, and 5–10 percent by weight of water.

6. A composition as defined by claim 3 wherein the alkali-metal soap component of the drilling fluid is the sodium hydroxide saponification product of disproportionated rosin.

7. A composition as defined by claim 3 wherein the said electrolyte comprises a mixture of sodium hydroxide and a sodium salt of a weak acid.

8. A composition as defined by claim 3 wherein the said emulsifying agent is sulfonated castor oil.

9. An electrically conductive oil-base drilling fluid comprising (1) a normally non-conductive drilling fluid initially prepared by dispersing in mineral oil between about 0.2 and about 10 percent by weight of water, between about 0.1 and about 5 percent by weight of hydratable clay, between about 0.2 and about 10 percent by weight of an alkali-metal alkali saponification product of heat-treated rosin, and between about 0.5 and about 5 percent of calcium oxide, said drilling fluid containing calcium in substantial excess of the amount chemically equivalent to said saponification product; (2) between about 0.5 and about 3 parts by weight of sodium bicarbonate per part of said excess of calcium, calculated as calcium oxide; (3) between about 0.75 and about 2 parts by weight of calcium oxide per part by weight of said sodium bicarbonate; (4) between about 3 and about 10 percent, based on the weight of the entire composition, of water; (5) between about 0.01 and about 5 percent, based on the weight of the entire composition, of an electrolyte selected from the class consisting of water-soluble metal hydroxides and water-soluble metal salts; and (6) between about 0.1 and about 8 percent, based on the weight of the entire composition, of a mixture comprising between about 25 and about 75 percent by weight of an alkali-metal humate and between about 75 and 25 percent by weight of an emulsifying agent selected from the class consisting of sulfated oils, sulfated alcohols, organic sulfonates, and alkali-metal salts thereof.

10. A composition as defined by claim 9 wherein said electrolyte comprises a mixture of sodium hydroxide and a sodium salt of a weak acid, and said emulsifying agent is sulfonated castor oil.

11. A composition as defined by claim 9 wherein the alkali-metal alkali saponification product component of the drilling fluid is a saponification product of heat-treated rosin comprising 45–55 percent by weight of potassium resin acid soaps, 30–35 percent by weight of unsaponifiables, 5–10 percent by weight of free resin acids, and 5–10 percent by weight of water.

12. A composition as defined by claim 9 wherein the alkali-metal alkali saponification product component of the drilling fluid is the sodium hydroxide saponification product of disproportionated rosin.

13. An electrically conductive oil-base drilling fluid comprising (1) a normally non-conductive drilling fluid initially prepared by dispersing in mineral oil between about 0.2 and about 10 percent by weight of water, between about 0.1 and about 5 percent by weight of hydratable clay, between about 0.2 and about 10 percent by weight of an alkali-metal alkali saponification product of heat-treated rosin, and between about 0.1 and about 5 percent by weight of calcium oxide, said drilling fluid being contaminated with calcium compounds so that it contains calcium in an amount substantially in excess of the amount chemically equivalent to said saponification product; (2) between about 0.5 and about 3 parts by weight of sodium bicarbonate per part of said excess calcium, calculated as calcium oxide; (3) between about 0.75 and about 2 parts by weight of calcium oxide per part by weight of said sodium bicarbonate; and (4) a conductivity additive comprising 100 parts by weight of water, between about 10 and about 60 parts by weight of an electrolyte selected from the class consisting of water-soluble metal hydroxides and water-soluble metal salts, and between about 20 and about 80 parts by weight of an emulsifying agent selected from the class consisting of sulfated oils, sulfated alcohols, organic sulfonates, and alkali-metal salts thereof, said conductivity additive being present in an amount sufficient to impart to the drilling fluid an electrical resistivity below about $50 \times 10^3$ ohm-cms.

14. A composition is defined by claim 13 wherein the electrolyte component of the conductivity additive composition comprises sodium hydroxide, sodium silicate, and trisodium pyrophosphate.

15. A composition as defined by claim 13 wherein the emulsifying agent component of the conductivity additive composition comprises between about 25 and about 75 percent by weight of sodium humate and between about 75 and about 25 percent by weight of an agent selected from the class consisting of sulfated oils, sulfated alcohols, organic sulfonates, and alkali-metal salts thereof.

16. A composition as defined by claim 15 wherein the electrolyte component of the conductivity additive composition comprises sodium hydroxide, sodium silicate, and trisodium pyrophosphate.

References Cited in the file of this patent

UNITED STATES PATENTS

| | | |
|---|---|---|
| 2,216,955 | Moore | Oct. 8, 1940 |
| 2,552,775 | Fischer | May 15, 1951 |
| 2,557,647 | Gates | June 19, 1951 |
| 2,573,961 | Fischer | Nov. 6, 1951 |

OTHER REFERENCES

Ser. No. 413,450, Hustinx (A. P. C.), published May 25, 1943.